April 12, 1955
F. W. W. MORLEY
2,706,125
SHAFT COUPLINGS
Filed Sept. 2, 1952
2 Sheets-Sheet 1
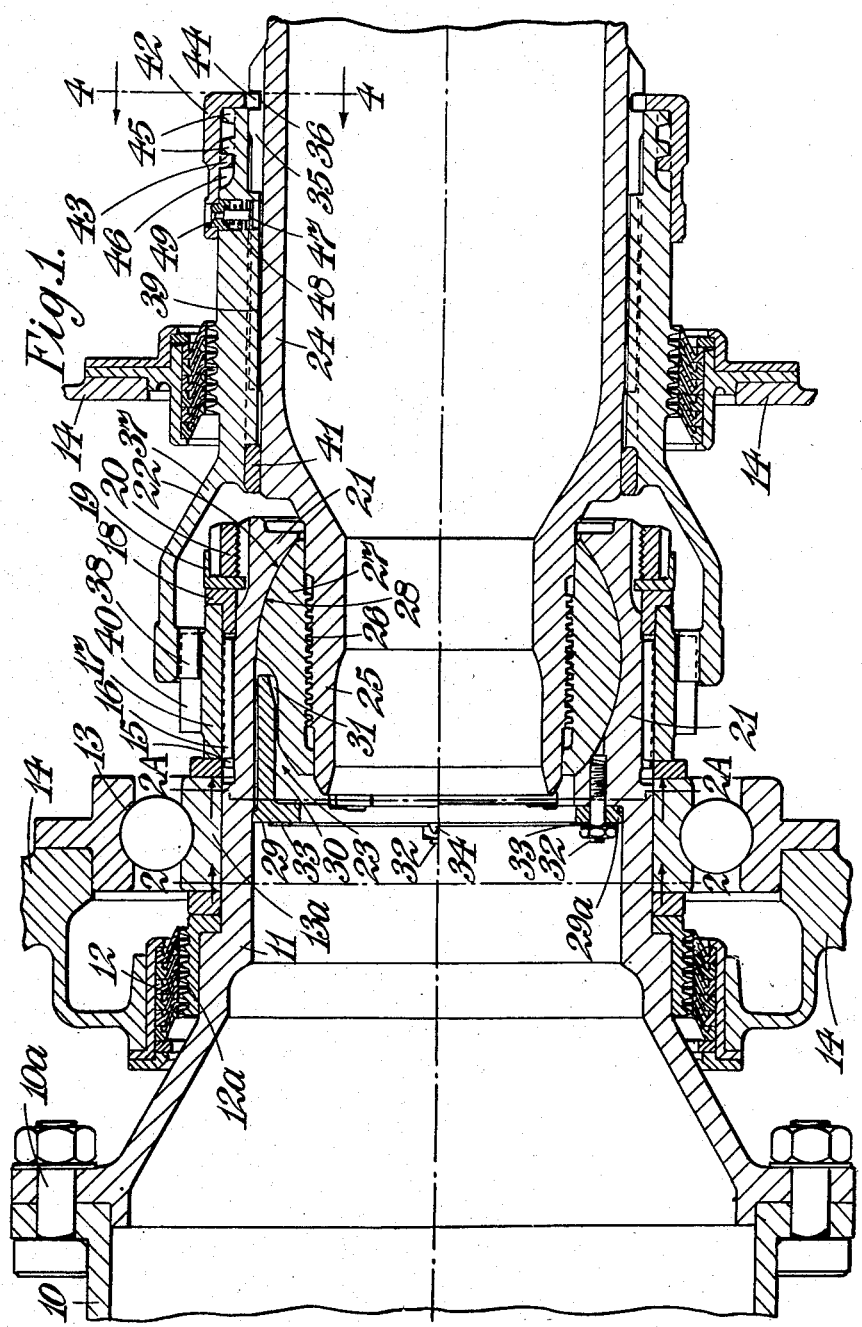
INVENTOR
F. W. W. MORLEY
BY Wilkinson & Mawhinney
ATTYS.

April 12, 1955     F. W. W. MORLEY     2,706,125
SHAFT COUPLINGS
Filed Sept. 2, 1952     2 Sheets-Sheet 2
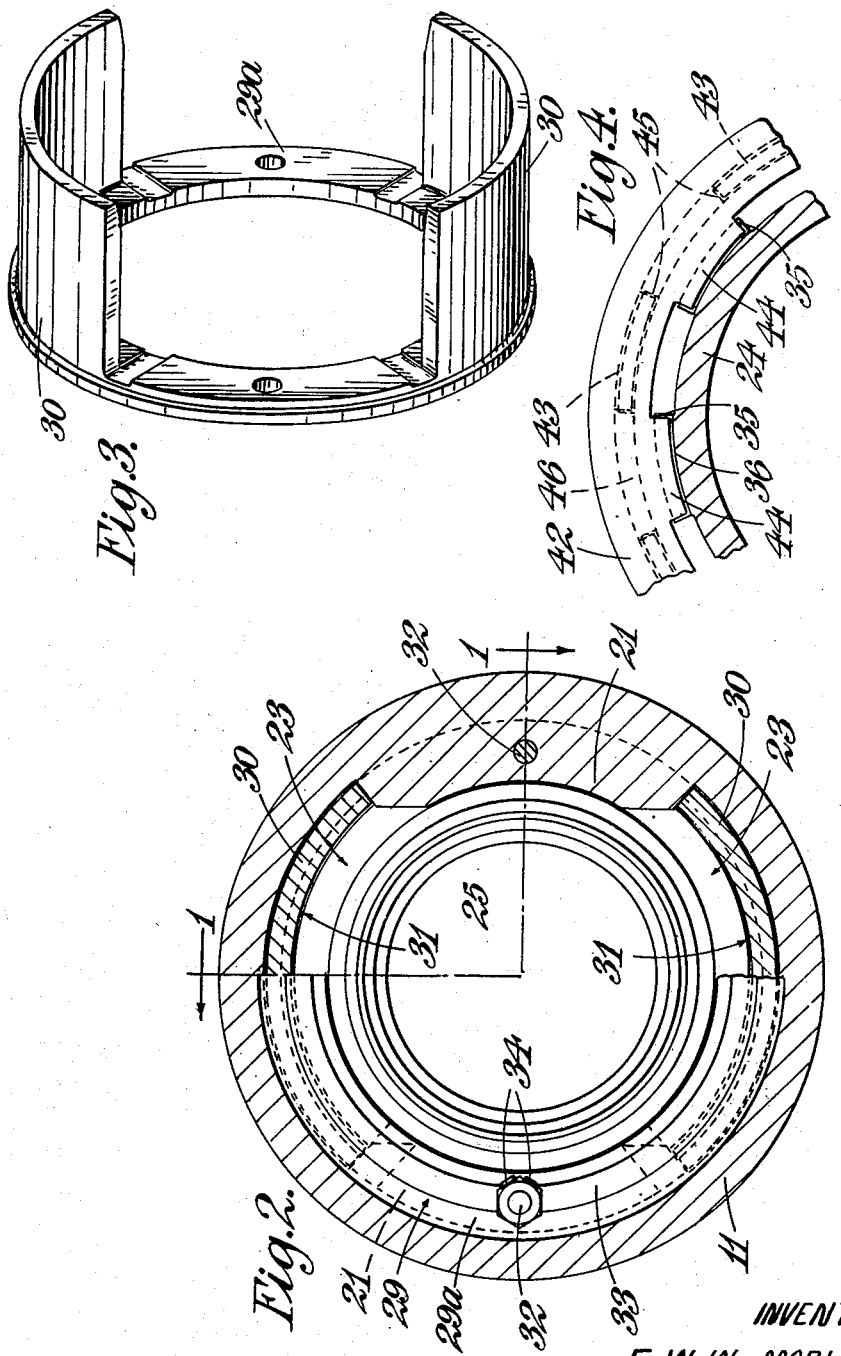
INVENTOR
F. W. W. MORLEY
BY Wilkinson & Mawhinney
ATTYS.

United States Patent Office

2,706,125
Patented Apr. 12, 1955

2,706,125
SHAFT COUPLINGS

Frederick William Walton Morley, Aston-on-Trent, England, assignor to Rolls-Royce Limited, Derby, England, a British company Application September 2, 1952, Serial No. 307,407
Claims priority, application Great Britain September 14, 1951

9 Claims. (Cl. 287—62)

This invention relates to shaft couplings and has for an object to provide an improved construction of shaft coupling which in addition to transmitting torque between a pair of shafts and accommodating end thrust between the shafts, enables axial adjustment of one shaft with respect to the other shaft.

According to the present invention, a shaft coupling comprises means rigid with one shaft and affording a part-spherical annular inwardly-facing recess coaxial with the shaft and having axially-spaced end walls, an annular member adapted to be entered into said recess and having a part-spherical outer surface to co-operate with said recess, said annular member being accommodated in and located axially in said recess, and said annular member being engaged with a thread on a part rigid with the other shaft, restraining means to restrain rotation of said annular member in said recess about the shaft axes, and a torque-transmitting member in torque-transmitting engagement with both said shafts, said restraining means and torque-transmitting member preventing rotation of the annular member on the thread when the coupling is engaged.

With this arrangement axial adjustment of one shaft with respect to the other shaft by relative rotation of said annular member and the threaded part of the shaft engaged by it can be effected for instance by arranging the torque-transmitting member to be disengageable from one of the shafts. Disengagement of the torque-transmitting member from one of the shafts leaves the shafts free to rotate with respect to one another so that on rotation of one shaft the annular member will be rotated relative to the part with which it has threaded engagement, thus displacing the shafts axially with respect to one another.

According to a feature of this invention, said restraining means may comprise an element secured on said one shaft and having a portion to engage the annular member to restrain rotation of the annular member relative to the said one shaft and the torque-transmitting member may be arranged for axial disengagement from one of the shafts to permit relative rotation of the shafts and thus rotation of the annular member on the thread on the other shaft. The element may comprise axial projections which engage corresponding recesses in the annular member.

According to a preferred feature of this invention, the element comprises a ring secured, for instance by studs, to the slotted wall of the recess-affording means and having axial extensions projecting through the slots in said wall to engage in corresponding recesses in the annular member.

According to another preferred feature of this invention, the torque-transmitting member comprises a sleeve having splined engagement with both said shafts in a manner to permit axial sliding of the sleeve relative to the shafts to disengage its splined connection with one of the shafts, and there is provided disengageable locking means to lock the sleeve in a position to transmit a drive between the shafts.

One embodiment of shaft coupling according to this invention will now be described as applied to coupling the compressor shaft of a gas-turbine engine to a turbine shaft for driving the compressor. The description makes reference to the accompanying drawings in which:

Figure 1 is an axial section through the coupling with the section taken on the line 1—1 of Figure 2, Figure 2 is a section through Figure 1, the left-hand half being on the line 2—2 and the right-hand half being on the line 2A—2A, Figure 3 is a perspective view of a part of the coupling, and Figure 4 is a section on the line 4—4 of Figure 1, parts being omitted for the sake of clarity.

Referring to the drawings, the compressor shaft 10 has secured to it by bolts 10a at its end adjacent the outlet of the compressor rotor a hollow stub shaft 11 and the stub shaft 11 is of stepped form and is arranged to carry rotating elements 12a of labyrinth seals 12, and a race 13a of a centre bearing 13 for supporting the compressor/turbine rotor assembly in stationary structure 14 intermediate the compressor and turbine.

The stub shaft 11 at its end remote from the compressor shaft 10 has external splines 15 to interengage with splines 16 on an internally and externally-splined ring 17 which is secured in position on the stub shaft 11 by a spacer ring 18, locking washer 19 and ring nut 20. This end of the stub shaft 11 is radially thickened internally and the inner surface of the radially thickened portion 21 of the shaft is machined to afford an annular recess coaxial with the shaft, the surface 22 of which recess is in the form of an equatorial zone of a sphere. The radially thickened portion 21 is also cut away internally of the shaft to form a pair of diametrically opposite slots 23 each of which leads into the recess through the wall thereof adjacent the end of the stub shaft 11 connected to the compressor shaft 10.

The turbine shaft 24 has at its end a portion 25 of reduced diameter which is externally screw-threaded, and engaged with the screw-thread 26 is an annular member 27 the external surface 28 of which is an equatorial zone of a sphere of such diameter as to fit within the recess in the radially thickened portion 21 of the stub shaft 11.

The spherical surface 22 of the recess in effect affords a socket to receive the annular member 27 and the whole acts as a ball and socket connection between the ends of the shafts 11, 24 to be connected and thus acts to transmit end thrusts between the shafts.

The slots 23 each have a width equal to the maximum dimension of the annular member 27 taken in the direction parallel to the axis of the shaft 11 when the coupling is assembled, thereby to permit the member 27 to be passed through the slots 23 to enter the recess having the spherical surface 22.

The annular externally-spherical member 27 is entered into the stub shaft 11 from its end which is connected to the compressor shaft 10 and is engaged with the spherical-surfaced recess by presenting the annular member 27 to the slots 23 with its axis at right angles to the shaft axis, passing the annular member 27 through the slots 23 into the recess and then rotating the annular member about an axis at right angles to the shaft axis and to its own axis to bring it into a position coaxial with the stub shaft 11, in which position the annular member is properly engaged in the recess. The screw-thread 26 on the end 25 of the turbine shaft 24 can then be engaged with the annular member 27.

The annular externally-spherical member 27 is retained in position in the recess and restrained against rotation about the axis of the stub shaft 11 by means of a ring member 29 having a ring portion 29a and a pair of axial part-cylindrical extensions 30 which have a circumferential extent substantially equal to that of the slots 23 in the radially thickened portion 21 of the stub shaft 11 and which extensions 30 engage by their ends remote from the ring portion 29a in depressions 31 machined into the part-spherical external surface 28 of the annular member 27. The ring 29 is secured to the radially thickened portion 21 of the stub shaft 11 by a pair of diametrically disposed threaded studs 32 which pass through the ring portion 29a and engage in threaded holes in the radially thickened portion 21 intermediate the slots 23 therein. A washer 33 having locking tabs 34 may be interposed between the ring 29 and the heads of the studs 32 there being a set of tabs adjacent each stud 32.

With the ring 29 secured in position the extensions 30 thereon engage in the depressions 31 in the externally-spherical member 27 so preventing rotation of the latter with respect to the stub shaft 11 about the axis of the stub shaft. The extensions 30, the depressions 31 and the slots 23 in the radially thickened portion 21 of the stub shaft 11 are provided with accurately-machined circumferentially-facing abutment surfaces.

The turbine shaft 24 is formed externally adjacent its end with axially-directed splines 35 which are made discontinuous as indicated at 36 adjacent their ends nearer the turbine.

The coupling also comprises a torque-transmitting member in the form of a sleeve 37 having two sets 38, 39 of internal splines. The set 38 of internal splines engages with the external splines 40 on the internally- and externally-splined ring 17 mounted on the stub shaft 11, and the other set 39 engages with the external splines 35 on the turbine shaft 24. Fitted within the sleeve 37 intermediate the two sets 38, 39 of splines and adjacent the ends of the second set 39 is a bush 41 fastened to the sleeve 37 which acts as a stop to limit axial movement of the sleeve 37 towards the turbine, but the arrangement is such that with the sleeve 37 in its torque-transmitting position there is sufficient axial clearance between the bush 41 and the ends of the splines 35 on the turbine shaft to permit axial movement of the sleeve 37 to disengage the first set 38 of splines from the splines 40 on the internally- and externally-splined ring.

When it is desired to adjust the shafts 10 and 11, and 24 axially with respect to one another the torque-transmitting sleeve 37 is displaced axially on the turbine shaft 24 to disengage the first set 38 of splines from the splines 40 on the internally- and externally-splined ring 17 and the turbine shaft 24 is then rotated. Since the annular externally-spherical member 27 is engaged on the turbine shaft 24 through the screw-thread 26 and is restrained against rotation with respect to the stub shaft 11, the annular externally-spherical member 27 will rotate relative to the turbine shaft 24 so causing axial displacement therebetween and also axial displacement between the two shafts 11 and 24.

In order to prevent undesired axial displacement of the torque-transmitting sleeve 37 with respect to shaft 24, means is provided to lock the sleeve in its torque-transmitting position. This means comprises a collar 42 having a pair of axially-spaced radial castellated flanges 43, 44, the castellations on the flange 43 being staggered with respect to those on the flange 44. The castellations on the flange 43 and the inwardly-directed flange 44 are arranged to abut against the axially-directed faces of corresponding axially-spaced sets of castellations on sleeve 37, the castellations of the flange 43 projecting into a circumferential groove 46 formed on the sleeve 37 to one side of the corresponding set of castellations 45 and the flange 44 abutting the opposite side of the other set of castellations 45. The castellations of the flange 44 engage in a circumferential groove 36 in splines 35 so that the castellations abut the splines 35. The sleeve 37 is thus locked against axial movement relative to shaft 24, and rotation of collar 42 relative to sleeve 37 is prevented by a spring-loaded plunger 47 which is provided in a bore 48 in sleeve 37 and engages in a hole 49 in the collar 42.

To disengage the splines 38, 40, it is necessary to move sleeve 37 axially with respect to shaft 24 and this is effected by depressing plunger 47 which permits collar 42 to be turned until the castellations of flange 44 are opposite the grooves between splines 35.

From the foregoing description it will be appreciated that the shaft coupling of this invention is not only capable of transmitting torque and end thrusts between the pair of shafts but also in a simple manner permits axial adjustment of the shafts with respect to one another.

I claim:

1. A shaft coupling between two coaxial shafts comprising means rigid with the first shaft and affording an annular recess having a part-spherical inwardly-facing surface coaxial with the first shaft and having axially-spaced end walls, an annular member having an external part-spherical surface and an internally-threaded bore, said annular member being accommodated in said recess with said external part-spherical surface cooperating with said inwardly-facing surface when the coupling is operative, whereby said annular member is prevented from axial movement in said recess, means rigid with the second shaft and having an externally-threaded portion in engagement with said internally-threaded bore, restraining means operative between said first shaft and said annular member to restrain rotation of said annular member in said recess about the common axis of the shafts and with respect to said first shaft, a first torque-transmitting part rigid with said first shaft, a second torque-transmitting part rigid with said second shaft, and a torque-transmitting member in torque-transmitting engagement with both said first and second torque-transmitting parts.

2. A shaft coupling as claimed in claim 1, wherein the first and second torque-transmitting parts and the torque-transmitting member have axially-extending portions, and the axially-extending portions of the torque-transmitting member cooperate slidably with the axially-extending portions of the first and second torque-transmitting parts, and said torque-transmitting member is mounted to move from a first position in which the axially-extending portions cooperate to transmit a torque between the shafts to a second position in which the axially-extending portions of the torque-transmitting member are free from torque-transmitting engagement with the axially-extending portions of one of the torque-transmitting parts, thereby to free said second shaft for rotation relative to said first shaft and to said annular member, whereby said second shaft may be displaced axially relative to the first shaft and said annular member by rotation of the externally threaded portion of said second shaft within the internally threaded bore of the annular member.

3. A shaft coupling as claimed in claim 2, having said torque-transmitting member comprising a sleeve, axial splines on said sleeve, axial splines on each of said torque-transmitting parts of said shafts and cooperating with the axial splines on said sleeve to permit axial sliding of said sleeve relative to the shafts between said first and second positions, and disengageable locking means to lock said sleeve in said first position of the torque-transmitting member.

4. A shaft coupling as claimed in claim 3 having said disengageable locking means comprising a collar mounted on said sleeve to rotate thereon, first projections on said collar, corresponding projections on one of said shafts adapted in a first position of rotation of the collar to be aligned axially with said first projections and to abut them to prevent relative axial displacement of the collar, the sleeve and said one of the shafts, and in a second position of rotation of said collar to be axially out of line with said first projections to permit axial displacement of said collar and the sleeve relative to the shafts, and disengageable spring-loaded means to hold the collar in said first position of rotation relative to the sleeve.

5. A shaft coupling as claimed in claim 4 having said spring-loaded means comprising a plunger accommodated to slide radially in a bore in said sleeve towards and away from a hole in the collar and adapted to be aligned with the hole in said first position of the collar, and a spring adapted to urge the plunger towards said hole.

6. A shaft coupling as claimed in claim 4, wherein said first projections are radially-projecting castellations on said collar adapted in said second position of the collar to slide in axially-directed grooves between the splines on said one of the shafts, and wherein said splines have gaps in their axial length whereby said corresponding projections are formed by the ends of the splines at the gaps.

7. A shaft coupling as claimed in claim 6, comprising also cooperating castellations on said collar and said sleeve, the castellations on the collar projecting into a circumferential groove on said sleeve and in said first position of said collar engaging behind the cooperating castellations on the sleeve.

8. A shaft coupling as claimed in claim 1, wherein said restraining means comprises an element secured to the first shaft and axial projections from said element to engage in corresponding axially-extending recesses in said annular member to restrain said rotation of said annular member relative to the first shaft.

9. A shaft coupling as claimed in claim 8, wherein said element is a ring secured to a part rigid with said first shaft and wherein said recesses have a circumferential width corresponding to the circumferential width of said axial projections.

References Cited in the file of this patent

UNITED STATES PATENTS 930,071    Greenlaw               Aug. 3, 1909
2,565,558   Highberg                Aug. 28, 1951